(12) United States Patent
Li

(10) Patent No.: US 6,782,034 B2
(45) Date of Patent: Aug. 24, 2004

(54) LASER PLUMBING AND LEVELING INSTRUMENT WHICH ADJUSTING HEIGHT OF HORIZONTAL LINE

(76) Inventor: Chuying Li, 602, Yu quan ge, Nam yue shan zhuang, Nanshan, Shenzhen, 518052 (CN)

( * ) Notice: Subject to any disclaimer, the term of this patent is extended or adjusted under 35 U.S.C. 154(b) by 0 days.

(21) Appl. No.: 10/169,539

(22) PCT Filed: Dec. 28, 2000

(86) PCT No.: PCT/CN00/00738

§ 371 (c)(1),
(2), (4) Date: Nov. 6, 2002

(87) PCT Pub. No.: WO01/50086

PCT Pub. Date: Dec. 7, 2001

(65) Prior Publication Data

US 2003/0101606 A1 Jun. 5, 2003

(30) Foreign Application Priority Data

Dec. 29, 1999 (CN) ........................................ 99127127 A
Aug. 2, 2000 (CN) ....................................... 00246264 U

(51) Int. Cl.[7] ................................................. H01S 3/00

(52) U.S. Cl. ........................ 372/109; 372/109; 372/101; 33/281; 33/283; 33/286; 33/291; 33/275; 33/285; 33/282; 33/290

(58) Field of Search ................................ 372/101, 109; 33/281, 283, 286, 291, 275, 285, 282, 290

(56) References Cited

U.S. PATENT DOCUMENTS

| | | | | | |
|---|---|---|---|---|---|
| 4,111,564 | A | * | 9/1978 | Trice, Jr. ...................... | 356/247 |
| 4,827,125 | A | * | 5/1989 | Goldstein .................... | 250/234 |
| 4,912,851 | A | * | 4/1990 | Rando et al. .................. | 33/227 |
| 4,988,192 | A | | 1/1991 | Knittel ........................ | 356/138 |
| 5,331,395 | A | | 7/1994 | Piske et al. .................. | 356/138 |
| 5,539,990 | A | | 7/1996 | Le ................................ | 33/83 |
| 5,572,797 | A | | 11/1996 | Chase .......................... | 33/286 |
| 5,907,907 | A | | 6/1999 | Ohtomo et al. ............... | 33/291 |
| 6,393,042 | B1 | * | 5/2002 | Tanaka ........................ | 372/101 |

FOREIGN PATENT DOCUMENTS

| | | |
|---|---|---|
| CN | 1164021 A | 11/1997 |
| EP | 0 488 046 A2 | 6/1992 |

* cited by examiner

*Primary Examiner*—Don Wong
*Assistant Examiner*—Delma R. Flores Ruiz
(74) *Attorney, Agent, or Firm*—Westman, Champlin & Kelly, P.A.

(57) ABSTRACT

The present invention discloses a laser-plumbing leveler with adjustable height of the horizontal line, which comprises a laser emitting device, a laser line (plane) projecting optical system, and a laser line (plane) rotating and/or moving unit, wherein the laser line (plane) projecting optical system comprises a horizontal laser unit, a vertical laser unit and/or inclined laser unit and so forth. The laser-plumbing leveler according to the invention can be used in building decoration or the like for positioning at different height in horizontal, vertical and inclined directions, and has the advantages of easy use, reliable leveling, simple construction and low price.

11 Claims, 4 Drawing Sheets

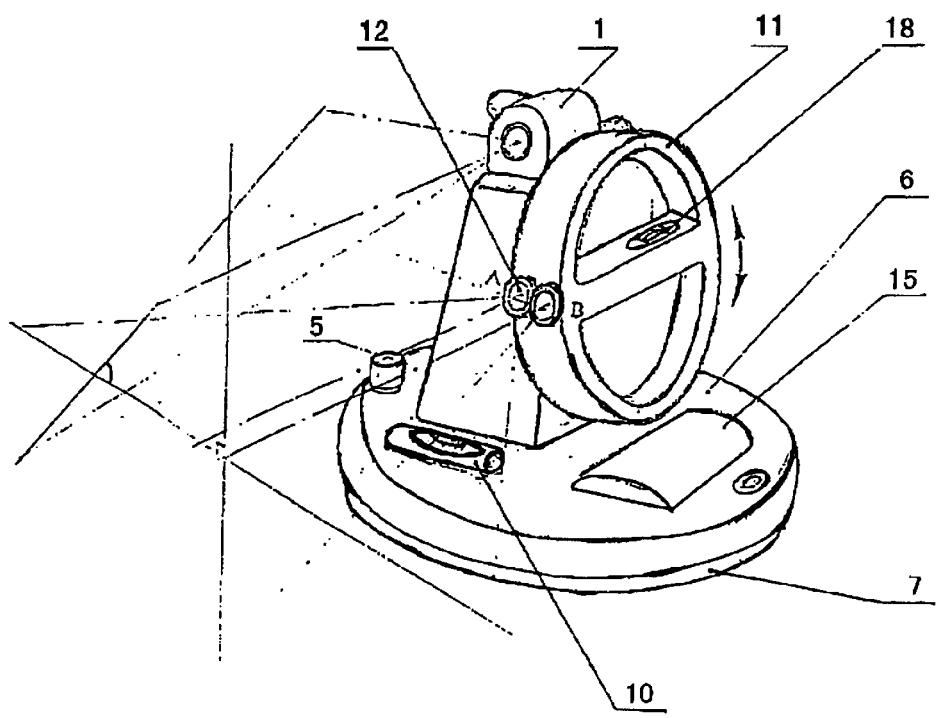
Fig.4
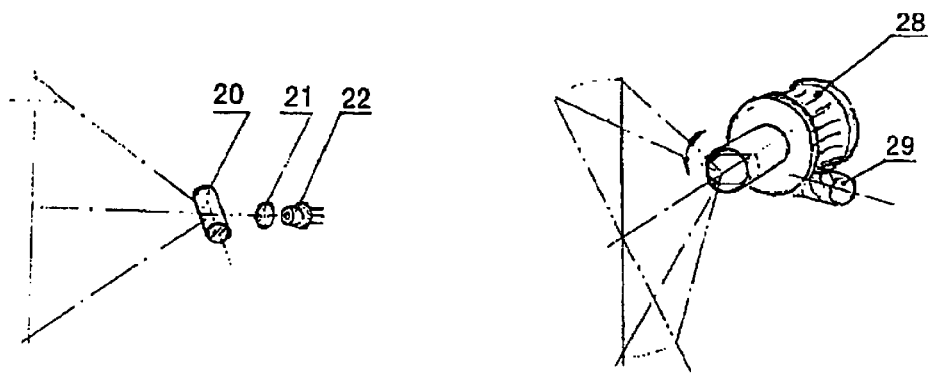
Fig.6
Fig.8

LASER PLUMBING AND LEVELING INSTRUMENT WHICH ADJUSTING HEIGHT OF HORIZONTAL LINE

This Application is a Section 371 National Stage Application of International Application No. PCT/CN00/00738 filed Dec. 28, 2000 and published as WO 01/50086 on Dec. 7, 2001, not in English and claims benefit of Chinese Patent Application Serial No. 99127127.0, filed Dec. 28, 1999 and Chinese Patent Application Serial No. 00246264.8, filed Aug. 2, 2000 which are hereby incorporated by reference in their entirety.

FIELD OF THE INVENTION

The present invention relates to a small sized laser instrument used for building decoration and the like, and-more particularly, to a laser-plumbing leveler with adjustable height of the horizontal line.

DESCRIPTION OF PRIOR ARTS

Ever since the laser device is applied actually to the field of engineering technology, there have been some instrument products that use the laser technology for orienting and positioning in building, decorating and the like.

The early laser levelers (laser gyroscope, etc.) employed gas or solid laser, so that they are large in size, single in function, and high in price, thus the performance thereof is very limited in use. In 1976, when Chairman Mao's Memorial Hall was built, a laser gyroscope representing achievements of scientific research of that time was used for controlling the ground leveling. This, of course, is much faster and easier in leveling as compared with the ordinary leveler used in the past. However, due to many reasons such as technical and economical reasons, this kind-of instrument was not produced in batches and not used widely for a considerable period of time. This kind of instrument appeared much earlier in foreign countries, was produced in batches in 1980's, and used widely in construction engineering initially.

In the early of 1990's, there was laser automatic leveling leveler using bar code technology in foreign countries, which was mainly used for mapping and measuring leveling lines in big scale construction works, and was not convenient for use in construction, decoration and installation of the building. Because it is high in price and lacks prominent advantages, it has not been used frequently in China up to the present time.

Appearance and gradual use of large quantities of the semi-conductor laser device provide certain conditions for the miniaturization and popularization of the laser instruments used in engineering. Therefore, in 1990's, many foreign manufacturers started successively to produce in batches laser gyroscope type leveler used in engineering and their prices were also decreased. Therefore, this type of instrument was widely used in the economically developed countries and regions (For example, products made by the American David White). Some foreign manufacturers (for example, TOPCON of Japan) also filled patent in China for such type of products. However, since technologies of this type of instrument are widely known, the remaining contents that can be applied for patent is very limited. In recent years, small laser gyrohorizon used in decoration works has been appeared in the international market, the price thereof is equivalent to several thousands yuan (RMB). Among them, the American Momentum Laser Inc. once filled an application for patent for its products, but the design has no major improvement other than the non-essential feature that employing two semi-conductor laser units of the same direction so as to increase the lightness. Some optical instrument manufacturers in China (such as Beijing Optical Instrument Plant, Northwest Optical Instrument Plant, etc.) also began to manufacture the same type products and the small laser gyrohorizon in recent years, but these products have no major technical improvements. Their prices are still about two thousands yuan (RMB), which are still too high for the domestic construction and decoration industry. More importantly, these domestic or foreign laser-leveling instruments are all single in function and not convenient for use. Especially, they can not provide, in a convenient and quick way, the horizontal line of discretional height as well as the plumb line and the inclined line of discretional direction. Prior to this invention, there was no one product that can meet these requirements and decrease the price as well, thus it is unable to meet requirements of construction, decoration and the like really.

According to the statistic of the relevant departments of China, in 1998, a total found of 200 billions yuan was used for decoration works of civilian purpose (excluding decoration of large-scale industrial and commercial buildings), wherein funds for tools, equipment and measuring units (inclusive of instruments) occupy a considerable proportion. This can be seen from the numerous decorating tool stores in large cities, medium-sized cities and small towns all over the country. According to a statistic made in the latter half of 2000, there were more than 90,000 formal decorating companies in China, and the number of decorating companies is more astonishing if those informal decorating companies with smaller decorating teams are counted. That being horizontal in lateral direction and being perpendicular in vertical direction and that keeping inclined or horizontal as it should be, are the basic and most important quality requirements for building decoration works. However, as the basic means for ensuring decoration quality, the instruments and measuring tools for keeping horizontal in lateral direction and perpendicular in vertical direction are out of data. In China, low accuracy and inconvenient plumb bob, carpenter's ink marker and leveling ruler of even thousands of years' history are still being used today. And the method of "striking inked line" is still used in construction, some even still use filled pipe to measure levelness, this not only hampers improvement of productivity seriously, but also makes it difficult in maintaining quality.

Internationally, the building decoration industry has always been a prosperous industry, which has enormous need for instrument. Therefore, a better instrument that can provide good orienting and positioning in horizontal, vertical and inclined direction, and is convenient in use and inexpensive is desperately needed both domestically and internationally.

Objects of the Invention

Accordingly, one object of the present invention is to provide a laser-plumbing leveler with adjustable height of the horizontal line, comprising a laser emitting device, a laser line (plane) projecting optical system, and a laser line (plane) rotating and/or moving unit.

The second object of the present invention is to provide a laser-plumbing leveler used for positing in horizontal direction at different heights in construction, building decoration and the like, which can quickly provide horizontal datum and ensure that the provided horizontal line is of a certain accuracy, and the provided horizontal line can be adjusted continuously in its height according to requirements.

The third object of the present invention is to provide an instrument which can be easily mounted without the need of special accessories such as tripod, does not need to move the instrument back and forth while adjusting the height of the horizontal line, and does not need to raise or lower the laser-plumbing leveler of the entire instrument.

The fourth object of the present invention is to provide a laser-plumbing leveler, which not only provides the horizontal line, but also the plumb line and/or inclined line, in which position of the inclined line is also adjustable.

The fifth object of the present invention is to provide a laser-plumbing leveler supported on a universal joint consisted of magnet and steel ball.

These and other objects of the present invention will be more clear through the following detailed description.

SUMMARY OF THE INVENTION

The universal laser-plumbing leveler with adjustable height of the horizontal line of the present invention comprises a laser emitting device, a laser line (plane) projecting optical system, a laser line (plane) rotating and/or moving unit, a connecting device and a fixing device.

The laser line (plane) projecting optical system comprises a horizontal laser unit, a vertical laser unit and/or a inclined laser unit. the laser unit mainly comprises a laser tube, a positive lens and a cylindrical lens, the positive lens is mounted between the laser tube and the cylindrical lens, and the laser unit can be rotated or moved around the main axis and/or the center of the instrument which is perpendicular to its main optical axis.

In the universal laser-plumbing leveler with adjustable height of horizontal line according to the present invention, the laser line (plane) rotating unit comprises a rotating portion unit, a vertical laser unit, and a horizontal laser unit mounted on the rotating portion unit, which can be mounted together or separately, on one side or on two sides.

Moreover, the universal laser-plumbing leveler with adjustable height of horizontal line according to the present invention comprises a pedestal, a base, a pillar, a pushbutton switch, a rotating port on unit, a lateral axle unit, a vertical laser unit and a horizontal laser unit, etc, in which the vertical laser unit and the horizontal laser unit are mounted on the rotating portion unit, and the rotating portion unit are coupled with the pillar via the lateral axle unit, and a zero position leveler is provided on the rotating portion unit. The base is disposed on the pedestal, and a horizontal leveler and leveling screws are provided on the base, pivots are provided under the pedestal, and the base and pedestal are connected via a tension spring and a supporting member. The lateral axle unit comprise a fixed bush, an intermediate bush, a fluororubber gasket and a main axle, where the intermediate bush is mounted between the fixed bush and the main axle, the fluororubber gasket is mounted on the main axle, an inclined inching screw is connected with the intermediate bush and causes the main axle to rotate and inch. The rotating portion unit formed into disc shape or any other shape and connected with the main lateral axle can be roughly rotated directly by hands. The laser inclined line unit can be mounted on the top end of the pillar, the laser inchlined line unit comprises a laser unit and an adjuster, etc., a laser tube is connected with the switch and drive power supply via an electric circuit.

Preferably, in the universal laser-plumbing leveler with adjustable height of horizontal line of the present invention, the laser line (plane) rotating unit further comprises a universal magnetic joint unit consisted of intensified magnet and steel ball, and an instrument body unit that can freely rotate on the joint, the horizontal laser unit and vertical laser unit mounted on the instrument body.

Moreover, the universal laser-plumbing leveler with adjustable height of horizontal line of the present invention employing the universal magnetic joint comprises a pedestal (inclusive of a pillar and magnetic absorbing disk), a magnetic joint unit consisted of intensified magnet and steel ball, an instrument body unit, a horizontal laser unit, a vertical laser unit, a power supply switch, a battery, a horizontal leveler, a zero position leveler and so forth. The two laser units of horizontal line and vertical line are mounted on the instrument body, and so are the horizontal and zero position levelers, which can be mounted on one side or two sides of the instrument body. The universal magnetic joint is connected between the instrument body and the pillar of the pedestal. All units on the instrument body can incline and rotate along with the instrument body within a very wide range (more than ±60°, or unlimited 360°), and can stop at any positions within the aforementioned range.

In the universal magnetic joint employed by the universal laser-plumbing leveler with adjustable height of horizontal line of the present invention, the steel ball can be fixed on the pillar or the instrument body, or connected with the instrument body or the pillar via a connecting member, in which an inching mechanism is optional. A magnetic absorbing disk is provided under the pedestal, upon requirements, it can absorb and attach the pedestal on a steel or iron member. The intensified magnet of the universal joint is fixed on the instrument body or the pillar, the instrument body centers around the center of the steel ball of the universal magnetic joint, the instrument body can be inclined by ±60° or more, and can stop at any positions within this range, meanwhile, it can rotate by 360° around the center of the steel ball and can stop at any positions. The main optical axis of the horizontal laser passes through the center of the magnetic joint (namely the center of the steel ball).

The horizontal leveler mounted on the instrument body can operate at different positions when it rotates around its own axle (within 360° range), and its leveling axis is parallel to the plane of the laser line emitted from the horizontal line laser unit. The zero position leveler is an ordinary leveler, and when it is leveled, the vertical laser provides the plumb radial plane.

Advantages of the Present Invention

The laser-plumbing leveler with adjustable height of the horizontal line according to this invention can be used for positioning in horizontal direction at different heights in construction, building decoration and the like, and can expeditiously provide the horizontal datum and ensure that the provided horizontal line is of a certain accuracy, and the provided horizontal line can continuously adjust its height according to the requirements. The instrument can be easily mounted without the need of special accessories such as tripod, does not need to move the instrument back and forth when adjusting the height of the horizontal line, and does not need to raise or lower the laser-plumbing leveler of the entire instrument yet. Furthermore, it not only provides the horizontal line, but also the plumb line and/or inclined line, in which position of the inclined line is also adjustable. It also has the advantages of easy use, reliable leveling, simple construction, easy promotion and low price.

BRIEF DESCRIPTION OF THE DRAWINGS

This present invention is further described in detail by referring to the accompanying drawings, in which:

FIG. 4 is a perspective view of the laser-plumbing leveler with adjustable height of the horizontal line according to this invention.

FIG. 6 is a laser route schematic view of the laser-plumbing leveler with adjustable height of the horizontal line according to this invention.

FIG. 8 is a simplified view showing the adjuster of the inclined line accessories of the laser-plumbing leveler with adjustable height of the horizontal line according to this invention.

In FIGS. 1 to 8, numerical reference 1 represents the inclined line accessory, numerical reference 2 represents the pillar unit, numerical reference 3 represents the lateral axle unit, numerical reference 4 represents the pushbutton switch, numerical reference 5 represents the leveling screw, numerical reference 6 represents the base unit, numerical reference 7 represents the pedestal unit, numerical reference 8 represents the inclining inching screw, numerical reference 9 represents the sleeve spring unit, numerical reference 10 represents the horizontal leveler, numerical reference 11 represents the rotating portion unit, numerical reference 12 represents the horizontal laser unit, numerical reference 13 represents the vertical laser unit, numerical reference 14 represents supporting member, numerical reference 15 represents battery box cap, numerical reference 16 represents the battery, numerical reference 17 represents the tension spring unit, numerical reference 18 represents zero position leveler unit, numerical reference 19 represents the pivot, numerical reference 20 represents the cylindrical lens, numerical reference 21 represents the positive lens, numerical reference 22 represents the laser tube, numerical reference 23 represents the drive circuit of the laser tube, numerical reference represents the fixed bush, numerical reference 25 represents the intermediate bush, numerical reference 26 represents the fluororubber gasket, numerical reference 27 represents the main lateral axle, numerical reference 28 represents the worm gear, and numerical reference 29 represents the worm.

In FIGS. 9 to 10, numerical reference 1 represents the vertical laser unit, numerical reference 2 represents the power supply switch, numerical reference 3 represents the battery, numerical reference 4 represents horizontal laser unit, numerical reference 5 represents the pedestal (having pillar and magnet), numerical reference 6 represents the universal magnetic joint consisted of intensified magnet and steel ball, numerical reference 7 represents the instrument body having battery box, numerical reference 8 represents the horizontal leveler and numerical reference 9 represents the zero position leveler.

Figure 1:
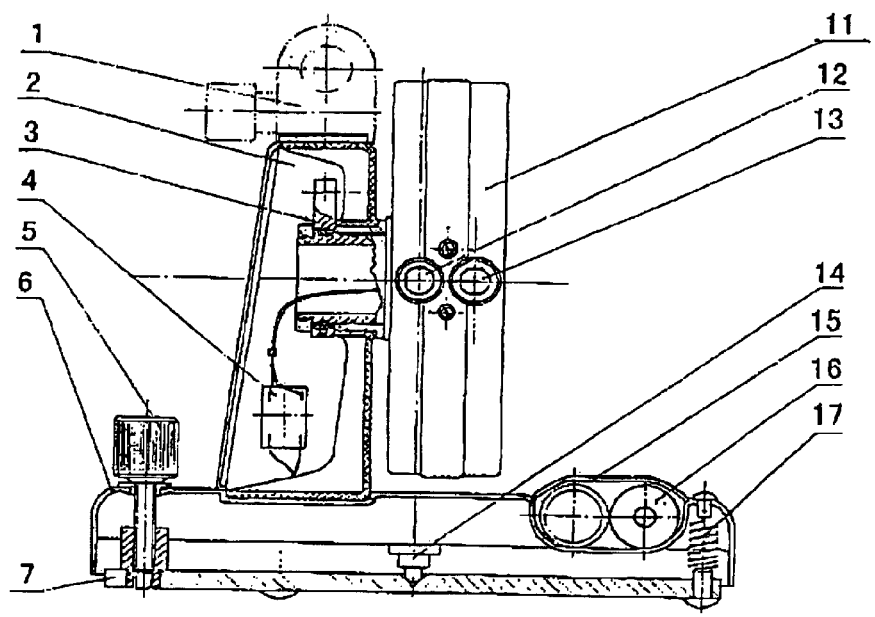
FIG. 1 is a partially sectional view of the laser-plumbing leveler with adjustable height of the horizontal line according to this invention.

The universal laser-plumbing leveler with adjustable height of horizontal line according to this present invention comprises a laser emitting device, a laser line (plane) projecting optical system, a laser line (plane) rotating and/or moving unit, a connecting device and a fixing device. The laser line (plane) projecting optical system comprises a horizontal laser unit, a vertical laser unit and/or an inclined laser unit; The laser unit mainly comprises a laser tube, a positive lens and a cylindrical lenses, in which the positive lens is mounted between the laser tube and the cylindrical lens, and the laser unit rotates around the instrument main lateral axle which is perpendicular to its main optical axis, and/or the center of the universal joint.

Further description of this present invention is given below through preferred embodiments, which are only used for explanation purpose but shall not limit the scope of this invention.

Preferred Embodiment 1

Referring to FIGS. 1 to 8, the laser-plumbing leveler according to the present invention comprises a pedestal 7, a base 6, a pillar 2 and a pushbutton switch 4, and further comprises a rotating portion unit 11, a lateral axle unit 3, a vertical laser unit 13, and a horizontal laser unit 12, in which the horizontal laser unit 12 and the vertical laser unit 13 are mounted on the rotating portion unit 11, and the rotating portion unit 11 is coupled with pillar 2 via the lateral axle unit 3.

Figure 2:
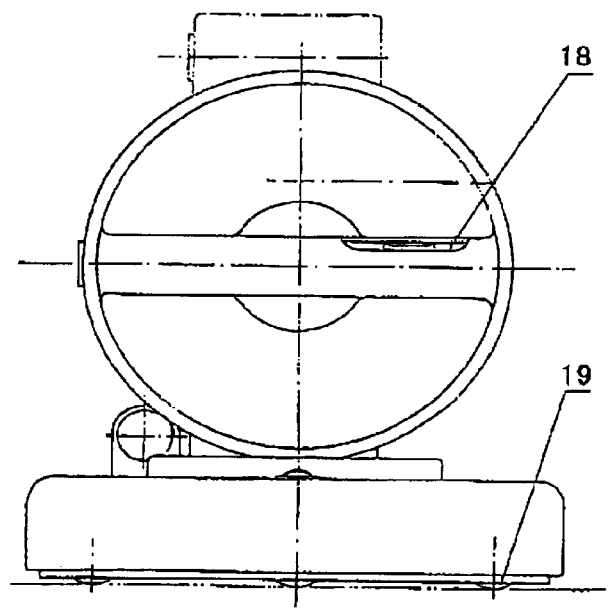
FIG. 2 is a right view of the laser-plumbing leveler with adjustable height of the horizontal line according to this invention.
Figure 3:
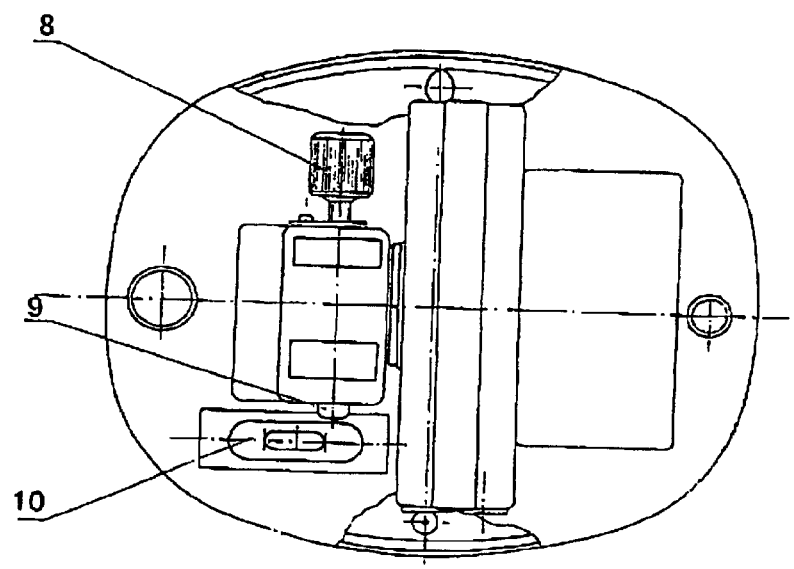
FIG. 3 is a top view of the laser-plumbing leveler with adjustable height of the horizontal line according to this invention.

In the laser-plumbing leveler according to this present invention, a base 6 is on the pedestal 7, a horizontal leveler 10 and leveling screws 5 are provided on the base 6, and a pivot 19 is provided under the pedestal 7, the base 6 is connected with 1 the pedestal 7 via the supporting member 14 and the tension spring 17, a battery box cap 15 and a battery 16 are provided on the vase 6. The horizontal laser unit 12 and the vertical laser unit 13 can be mounted at any positions on the rotating unit 11 together or separately, the rotating unit can be of disc shape as shown in FIG. 1 to 3 or any other shapes, on which the zero position leveler 18 is mounted. The lateral axle 3 comprises a fixed bush 24, an intermediate bush 25, a flurorubber gasket 26, and a main lateral axle 27, wherein the intermediate bush 25 is provided between the fixed bush 24 and the main lateral axle 27, the flurorubber gasket 26 is fixed on the main lateral axle 27, an inclined inching screw 8 is connected with the intermediate bush 25 and drives the main lateral axle 27 to rotate and inch; a laser inclined line accessory 1 can be mounted on the top end of the pillar, 2, the laser inclined line accessory 1 comprises a laser unit and an angle adjuster; the laser unit in the horizontal laser unit 14, the vertical laser unit 13 and the inclined line accessory 1 comprise a laser tube 22, a positive lens 21 and a cylindrical lens 20, where the positive lens 21 is mounted between the laser tube 22 and the cylindrical lens 20, and the laser tube 22 is connected with the switch 4 and power supply via an electric circuit 23.

Preferred Embodiment 2

Figure 9:
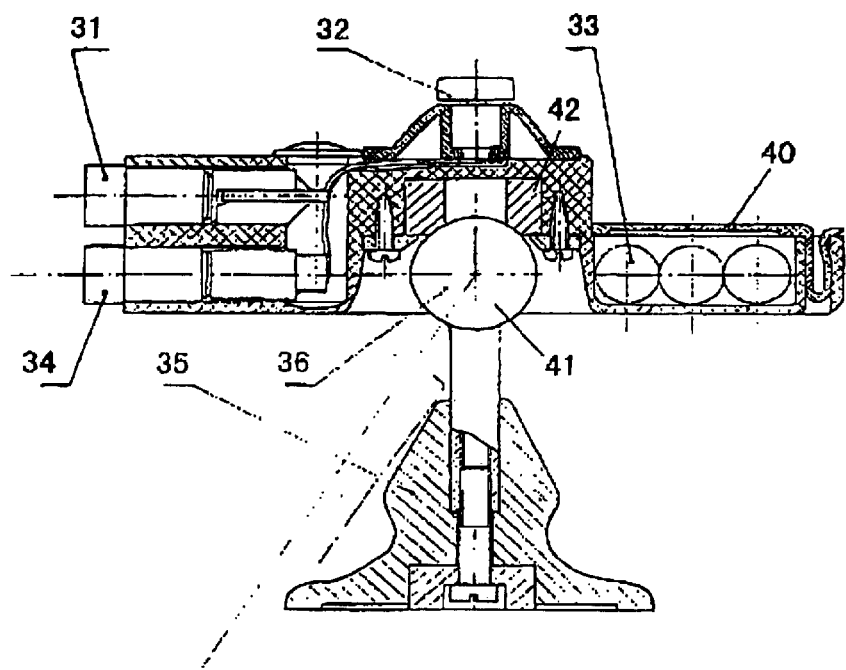
FIG. 9 is a sectional view of another laser-plumbing leveler with adjustable height of the horizontal line according to this invention.
Figure 10:
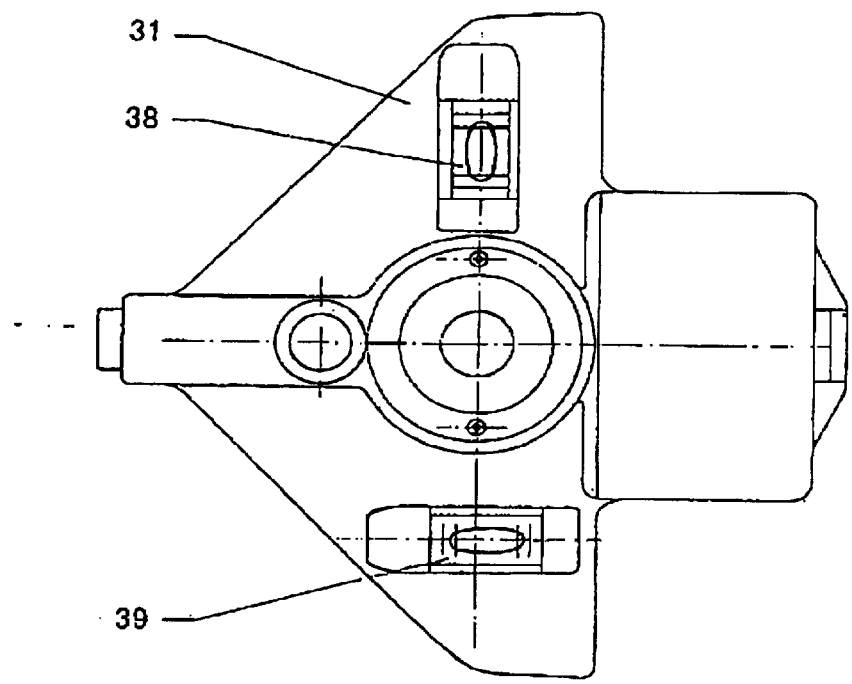
FIG. 10 is a top view of another laser-plumbing leveler with adjustable height of the horizontal line according to this invention.

Referring to FIGS. 9 to 10, the laser-plumbing leveler according to this prevent invention comprises a pedestal 35, a power supply switch 32, an instrument body 37 having battery box 40, a universal magnetic joint 36, a horizontal laser unit 34, a vertical laser unit 31, a horizontal leveler 38, a zero position leveler 39 and so forth. The horizontal laser unit 34, the vertical laser unit 31, the horizontal leveler 38 and the zero position leveler 39 are mounted on the instrument body 37, on the instrument body are also mounted the power supply switch 32 and the battery box 40 receiving batteries 33, the instrument body is connected with the pillar of pedestal 35 via the universal magnetic joint 36.

In the universal laser-plumbing leveler with adjustable height of horizontal line of the present invention employed a universal magnetic joint 36, the universal magnetic joint 36 consisted of steel ball 41 and intensified magnet 42 is mounted on the pedestal 35 having a pillar and an absorbing magnet. The instrument body 37 is connected with the magnet of the universal magnetic joint 36 while he pedestal 35 having the pillar and the absorbing magnet is connected with the steel ball 41 of the universal magnetic join 36, in which they can be connected with each other by direct fixing or by a connecting member and an inching mechanism. The instrument body 37 is provided with a battery box and a power supply switch 32. The vertical laser unit 31, the horizontal laser unit 34, the horizontal leveler 38 and the zero position leveler 39 are all mounted on the instrument body. They can be mounted in any positions on the instrument body, and can be mounted together or separately in the same direction or in the opposite direction. The vertical laser unit is above the horizontal laser unit, and the instrument body can be in the shape shown in FIG. 1 or FIG. 2, or in any other shapes.

The main optical axis of the horizontal laser unit 34 (optical axis of the laser tube and lens set) passes through the rotating center of the universal magnetic joint 36 (namely the center of the steel ball). The laser line plane of the vertical laser unit 31 also passes the center of magnetic joint 36. The horizontal axle of the horizontal leveler 38 is parallel to that of the horizontal laser unit. When the zero position leveler 39 is leveled with the horizontal leveler 38, the laser line plane of the horizontal laser unit is horizontal (zero position).

When the horizontal lever 38 is leveled and the instrument body 37 is inclined in another direction (the zero position leveler 39 is not leveled), the horizontal laser unit 34 can project horizontal laser lines having different height on the working plane and the vertical laser unit 31 can project vertical laser lines on the working plane.

The constructions of the horizontal and vertical laser unit are identical to that of the laser unit of the preferred embodiment 1.

This present invention combines the horizontal and vertical orienting and positioning works in building and decoration into one instrument, with the height of the horizontal orienting line being adjustable and position of the perpendicular line being movable, furthermore, it can provide inclined line, solving the problems that have not been properly handled in civil building, decoration and similar works, thus it greatly quicken the decoration and other works, enhancing productivity and greatly improving quality. It also helps the decoration work get rid of the primitive and backward status in which the pipe and the leveler rule were used for leveling, the plumb bob was used for setting plumb line and carpenter's ink line was used to straightening, thus creating a favorable condition for the enormous improvement of decoration and other works. Though this present product has more powerful functions than the leveler and laser gyroscope as described in the background of related arts, it has the further advantages of simplified construction and low cost (about one-fourth to one-third of the currently lowest price of laser gyroscope, and tens of times lower than the price of imported laser gyroscope) as compared with the already existing laser gyroscope described in the background of related arts, which is comparable with ordinary motorized tools, thus it can be easily popularized and widely used.

This invention uses semi-conductor laser tube as the source of laser, and the laser line converges after passing through a positive lens set, improving parallelism of the beams (with the emitting light projecting into a nearly round light spot); the emitting light then passes through a cylindrical lens which spread it into a sector perpendicular (orthogonal) to the axis of the cylindrical lens, so that when projecting on a working plane (for example, on a wall), a contrasting red laser line (straight line) is formed, and by changing direction of the axis of the cylindrical lens, the projection lines in horizontal direction, vertical direction and inclined direction can be obtained on the working plane (see FIG. 6).

Means of Manufacture and Application

Figures 5, 7:
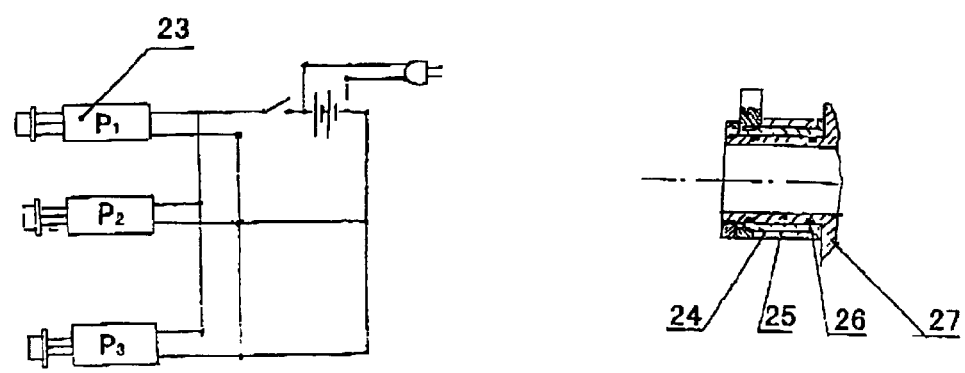
FIG. 5 is a simplified electric circuit diagram of the laser-plumbing leveler with adjustable height of the horizontal line according to this invention.
FIG. 7 is a sectional view of the main lateral axle of the laser-plumbing leveler with adjustable height of the horizontal line according to this invention.

The present invention uses two groups of laser unit and optical lens to generate horizontal line and plumb line respectively. The mutually perpendicular relationship between the horizontal line and plumb line (plane) projected by the two groups of laser unit is realized by adjusting the axis direction of the cylindrical lens of the two groups of laser unit (inclusive of the lens). The laser emitting tube is powered by the dry battery, and a simple drive power source device is provided between the battery and the laser tube, this kind of power supply circuit has been widely used in products such as laser pointer, laser electronic toy and laser head unit of VCD and DVD. To allow for long time continuous operation, this instrument can be provided with external storage cell and charger accessories or AC power supply accessories according to customers' particular needs, and the circuit of the entire instrument is very simple, and FIG. 5 is a schematic view showing the principle of the circuit.

According to this present invention, the instrument uses the leveler (leveling bubble) to provide horizontal datum, with manual leveling.

According to this present invention, the laser unit (inclusive of the lens) that generates the horizontal line can rotate around the instrument main lateral axle perpendicular to its main optical axis (in the preferred embodiment 1) or rotate around the center of the instrument (the center of steel ball in the preferred embodiment 2). When the working plane is orthogonal to the vertical plane that passes through the main optical axis of said laser unit, if the instrument rotates to a different position, it will project the horizontal lines of different height on the working plane (for example a wall). As the construction used for the laser unit rotating around the main axle, there are a plurality of forms, for example, the laser unit can be on the edge of the roulette-shaped hand wheel of the rotating portion unit rotating around the main lateral axle, or on elements of other shape that rotate around the main lateral axle.

According to this present invention, the laser unit for generating plumb line and the laser unit for generating horizontal line are mounted together on the elements that rotate around the main lateral axle of the instrument or the center of the instrument (center of the universal joint). In the plant, laser line planes projected by these two groups of laser unit are adjusted so that they are perpendicular to each other. When the rotating part turn 180° away from the zero position, the plumb line (plane) rotates to the back of the instrument; when turning 90°, a connecting line between the plumb lines on the front and the back is generated on the working plane in the zenith direction; and the horizontal laser unit then generates a lateral line that is perpendicular to it. Turning of the instrument pedestal (see the preferred embodiment 1) or the instrument body (see the preferred embodiment 2) can generate plumb line (plane) on different positions.

In the preferred embodiment 1, the instrument is adjusted to such status before leaving factory that when the instrument is in zero position, the main optical axis of the laser unit is horizontal, at the same time the horizontal plane projected by the horizontal laser unit is parallel to the horizontal datum line provided by the leveler. Under this status, when the main axle rotates to a different position, the laser line plane projected by the horizontal laser unit still maintains parallelism with the horizontal datum line provided by the leveler at a certain accuracy. The leveler is mounted on the base that can be slightly inclined with respect to the instrument pedestal, and since the base only needs leveling in one direction, only one leveling screw is needed, while other parts are leveled with the base. Two semi-spherical supports and a tension spring are used for the connection between the pedestal and base. Therefore, when leveling, height of the instrument center remains unchanged, and the instrument is easy in use. Since specific construction of this portion is conventional (existing technology), description thereof is given very briefly. In order to accurately provide horizontal line of desirable height, accurate inching must be provided for the rotating portion unit that rotate around the main lateral axle, thus the main lateral axle is provided with an inching screw, in order to simplify the construction and to have a simple action when roughly moving the main lateral axle, the main lateral axle may not utilize braking screw used on typical precision instruments, but frictional braking axles which can continuously rotate by 360° (see FIG. 7). The fluororubber gasket (with outside diameter slightly bigger than the inner diameter of the intermediate bush) between the main lateral axle and the intermediate bush (inching bush) provides the fastening forces required for frictional braking. When the inching screw causes the intermediate to inch, the main lateral axle inches with it. parts rotating along with the main lateral axle are very light in weight, and there is no side drop in natural state, therefore, the braking force is quite sufficient.

Another leveler is mounted on the rotating portion unit (for example, roulette) which rotate around the main lateral axle and is provided with a laser unit, the horizontal datum line of which is adjusted before leaving factory so that it is parallel to the main optical axis of the horizontal laser unit. Therefore, after leveling the base of the instrument, when rotating the main lateral axle until, this leveler is leveled, the main optical axis of the horizontal laser unit and its extended laser line plane are in horizontal status. We define this position as the "zero position of the instrument", and call this leveler a "zero position leveler". In some works, the horizontal plane provided by this kind of instrument under this status can be used to control construction site leveling or for any other kinds of job. When the main optical axis of the horizontal laser unit rotates around the main lateral axle, a plane perpendicular to the main lateral axis is formed, which we define as the "main plane" of the instrument, and to keep the horizontal line projected on the working plane (for example, surface of a wall) always horizontal, the instrument must be so mounted that the main plane is orthogonal to the working plane.

According to this present invention, a third group of laser which can rotate around its own main optical axis can also be used so as to produce inclined line with its inclination being adjustable, and to project on the working plane. There are many mechanisms to be used for rotating the laser unit around its main optical axis, for example, gear and worm set, wherein, if 18-teeth gear and single head worm are used, for every turn the gear rotate, the inclined line is inclined by 20°, and it can be easily operated by reading the graduation. The inclined line accessory has another incidental function: when the instrument is at zero position and the inclined line is adjusted until it is parallel with the horizontal line, at this time, if the horizontal laser unit is rotated to change the height of the horizontal line, it can be used to check if the horizontal line is still horizontal (in other words, if the main plane is orthogonal to the working plane). The laser plumb plane projected by the plumb line laser unit can also be used to check if the working plane (for example, surface of a wall) are vertical and straight: leveling the instrument, when it is at zero position, to project horizontal line on the working plane, to rotate the instrument pedestal until its laser plumb plane is in the same direction of the working plane and then check the levelness of the instrument. Using a small or ordinary ruler to check the distance between to the near end and far end of the instrument on the horizontal line, and to adjust them equal; then, using small ruler (or ordinary ruler) to check if the working plane is straight and plumb with reference to the laser plumb plane.

In the Preferred Embodiment 2:

The plane of laser line emitted from the horizontal laser unit is orthogonal to that of the laser line emitted from the vertical laser unit, and their intersecting line is just the main optical axis of the horizontal laser unit, which also passes through the center of steel ball of the universal magnetic joint (it may not pass through the center of the steel ball). Leveling axis of the horizontal leveler is parallel to the plane of laser line emitted from the horizontal laser unit, and is perpendicular to the plane of laser line emitted from the vertical laser unit, while the axis of zero position leveler is perpendicular to the leveling axis of the horizontal leveler and is parallel to the horizontal laser line plane. When the instrument body tilts and rotates to different positions, it will project two mutual perpendicular laser line planes at different positions and different heights as well. When leveling the horizontal leveler and the zero position leveler, the two laser unit, namely horizontal and vertical, will project a horizontal and a vertical datum plane (zero position). Since the instrument body can rotate by 360°, the horizontal and vertical laser line planes may not move and the pedestal can be rotated to face any direction. When the levelness of the horizontal leveler is maintained while the instrument body is tilted, the plane of laser line emitted from the vertical laser unit maintains vertical, and the horizontal laser unit emits horizontal laser line of different heights on the plane (for example, surface of a wall) that is orthogonal to the vertical laser plane.

When the instrument body is tilted around the intersecting line ( which is the main optical axis of the horizontal laser unit) of the horizontal and vertical laser planes, inclined lines of different heights can be emitted.

The plane of laser line emitted from the vertical laser unit or from the horizontal laser unit can be used to check if the working plane is straight. For example, it can be used to check if the surface of a wall is flat and straight, the specific procedures are: leveling the instrument, when at zero position, to project horizontal laser on the working plane, then to rotate the instrument body until the instrument plumb plane and the working plane are in the same direction, and to check the levelness of the instrument. Using a small ruler or ordinary ruler to check the distances between the near end and far end of the instrument on the horizontal line, and to adjust them equal; then, using small ruler (or ordinary ruler) to check if the working plane is flat, straight and plumb.

The pedestal can be place on the ground or any stable object (for example, a table), and can also use the magnetic absorbing disk to be absorbed on an iron or steel object (for example, a steel support); the bottom face of the pedestal can be placed horizontally, and can also be absorbed on a vertical face of an iron and steel object vertically. The instrument can still work even if it is absorbed on an inclined steel member.

What is claimed is:

1. A laser-plumbing leveler with adjustable height of the horizontal line, comprising:
   a pedestal unit;
   a base unit mounted on said pedestal unit;
   a lateral axle unit mounted on a pillar unit of said based unit, and an axis thereof being substantively horizontal;
   a rotating portion unit supported by said lateral axle unit and capable of pivoting about said axis of said lateral axle unit;
   a horizontal laser unit for projecting a horizontal laser line, said horizontal laser unit being mounted on said rotating portion unit so as to project the horizontal laser line whose height is changed along with the rotation of said rotating portion unit, and comprising a laser tube, a positive lens and a cylindrical lens, in which the positive lens is disposed between the laser tube and the cylindrical lens;
   a vertical laser unit for projecting a vertical laser line, said vertical laser unit being mounted on said rotating portion unit and adjacent to said horizontal laser unit, so that the vertical laser line being orthogonal to said horizontal laser line, the vertical laser unit comprising a laser tube, a positive lens and a cylindrical lens, in which the positive lens is disposed between the laser tube and the cylindrical lens; and
   a power supply for supplying power to said horizontal laser unit and said vertical laser unit.

2. The laser-plumbing leveler with adjustable height of the horizontal line according to the claim 1, wherein said horizontal laser unit an said vertical laser unit are juxtaposed to each other on said rotating portion unit, primary optic axes of said horizontal laser unit and said vertical laser unit, which are formed by connecting centers of said laser tube, said positive lens and said cylindrical lens of said horizontal laser unit and said vertical laser unit respectively, are both intersected and orthogonal to said axis of said lateral axle unit.

3. The laser-plumbing leveler with adjustable height of the horizontal line according to the claim 2, further comprising an inclined line accessory mounted on a top of said pillar unit and power-supplied by said power supply, said inclined line accessory includes an inclined laser unit for projecting an inclining laser line and an angle adjuster for adjusting an inclination of the inclining laser line projected by the inclined laser unit, the inclined laser unit having a laser tube, a positive lens and a cylindrical lens, in which the positive lens is disposed between the laser tube and the cylindrical lens.

4. The laser-plumbing leveler with adjustable height of the horizontal line according to the claim 1 or 2, further comprising a horizontal leveler mounted on said base unit and used for determining whether said base unit and said axis of said lateral axle unit are horizontal so as to determine whether said projected horizontal laser line is horizontal; and a leveling screw for adjusting level of said base unit.

5. The laser-plumbing leveler with adjustable height of the horizontal line according to the claim 4, further comprising a zero position leveler for determining whether said primary optic axes of said horizontal laser unit and said vertical laser unit are horizontal, said zero position leveler being mounted in said rotation portion unit, when said horizontal leveler and said zero position leveler are all indicated to be level, said horizontal laser unit emits a horizontal laser plane and said vertical laser unit emits a vertical laser plane.

6. The laser-plumbing leveler with adjustable height of the horizontal line according to the claim 5, wherein said lateral axle unit comprises a fixed bush, an intermediate bush, a fluororubber gasket an a main lateral axle, in which the intermediate bush is mounted between the fixed bush and the main axle, the fixed bush is fixed to said pillar unit, the fluororubber gasket is fit over the main axle fixed to said rotation portion unit, an inclined inching screw is mounted on the intermediate bush, when the inclined inching screw is adjusted, the intermediate bush can be rotated so as to rotate the rotation portion unit slightly.

7. The laser-plumbing leveler with adjustable height of the horizontal line according to the claim 1, further comprising a power supply switch for controlling power supplying from said power supply to said horizontal laser unit and said vertical laser unit.

8. The laser-plumbing leveler with adjustable height of the horizontal line according to the claim 1, wherein said base unit is connected to said pedestal unit via a supporting member and a tension spring, wherein said power supply is mounted in said base unit and wherein said pedestal unit is provided with fulcrums on bottom surface thereof.

9. A laser-plumbing leveler with adjustable height of the horizontal line, comprising:
   a pedestal unit having a pillar and an absorbing magnet;
   a universal magnetic joint consisted of a steel ball and an intensified magnet, said intensified magnet being seated on said steel ball, and said steel ball is connected to said pedestal unit;
   an instrument body connected to said magnet of said universal magnetic joint and capable of rotating in an arbitrary direction around said magnetic joint, said magnet of the universal magnetic joint can be mounted on said pedestal unit or said pillar, and said steel ball being mounted on the instrument body provided with an inching mechanism;
   a horizontal laser unit for projecting a horizontal laser line, said horizontal laser unit being mounted on said instrument body and comprising a laser tube, a positive lens and a cylindrical lens, in which the positive lens is disposed between the laser tube and the cylindrical lens;
   a vertical laser unit for projecting a vertical laser line, said vertical laser unit being mounted on said instrument body and adjacent to said horizontal laser unit, so that the vertical laser line being orthogonal to said horizontal laser line, the vertical laser unit comprising a laser tube, a positive lens and a cylindrical lens, in which the positive lens is disposed between the laser tube and the cylindrical lens; and
   a power supply for supplying power to said horizontal laser unit and said vertical laser unit.

10. The laser-plumbing leveler with adjustable height of the horizontal line according to the claim 9, further comprising a power supply switch for controlling power supplying from said power supply to said horizontal laser unit and said vertical laser unit.

11. The laser-plumbing leveler with adjustable height of the horizontal line according to the claim 9, further comprising a horizontal leveler and a zero position leveler mounted on said instrument body, wherein when the horizontal leveler rotates to any position around an axis thereof, it can indicate whether the axis is horizontal, the axis thereof is orthogonal to a main optical axis of said horizontal laser unit and parallel to a laser plane emitted by said horizontal laser unit so as to determine whether a laser line projected by said horizontal laser unit is horizontal, the main optical axis is a line connecting centers of said laser tube, said positive lens and said cylindrical lens of said horizontal laser unit, and an axis of said zero position leveler is parallel to the main optical axis of said horizontal laser unit so as to determine together with the horizontal leveler whether a laser plane emitted by the horizontal laser unit is horizontal.

* * * * *